US007970727B2

(12) United States Patent
Zhao et al.

(10) Patent No.: US 7,970,727 B2
(45) Date of Patent: Jun. 28, 2011

(54) METHOD FOR MODELING DATA STRUCTURES BY CREATING DIGRAPHS THROUGH CONTEXUAL DISTANCES

(75) Inventors: Deli Zhao, Beijing (CN); Zhouchen Lin, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 12/032,705

(22) Filed: Feb. 18, 2008

(65) Prior Publication Data

US 2009/0132213 A1    May 21, 2009

Related U.S. Application Data

(60) Provisional application No. 60/998,683, filed on Oct. 12, 2007.

(51) Int. Cl.
*G06F 17/10* (2006.01)
(52) U.S. Cl. .............................................. 706/60; 703/2
(58) Field of Classification Search ....................... 706/60
See application file for complete search history.

(56) References Cited

U.S. PATENT DOCUMENTS

| | | | |
|---|---|---|---|
| 4,803,736 | A | 2/1989 | Grossberg et al. |
| 5,313,532 | A | 5/1994 | Harvey et al. |
| 6,334,131 | B2 | 12/2001 | Chakrabarti et al. |
| 6,862,586 | B1 | 3/2005 | Kreulen et al. |
| 6,904,420 | B2 | 6/2005 | Shetty et al. |
| 7,024,404 | B1 | 4/2006 | Gerasoulis et al. |
| 7,194,483 | B1 | 3/2007 | Mohan et al. |
| 2006/0010217 | A1 | 1/2006 | Sood |

OTHER PUBLICATIONS

Deli Zhao; Zhouchen Lin; Xiaoou Tang; , "Contextual Distance for Data Perception," Computer Vision, 2007. ICCV 2007. IEEE 11th International Conference on , vol., no., pp. 1-8, Oct. 14-21, 2007 doi: 10.1109/ICCV.2007.4408854  URL: http://ieeexplore.ieee.org/stamp/stamp.jsp?tp=&arnumber=4408854&isnumber=4408819.*
de la Higuera, C.; Mico, L.; , "A contextual normalised edit distance," Data Engineering Workshop, 2008. ICDEW 2008. IEEE 24th International Conference on , vol., no., pp. 354-361, Apr. 7-12, 2008 doi: 10.1109/ICDEW.2008.4498345  URL: http://ieeexplore.ieee.org/stamp/stamp.jsp?tp=&arnumber=4498345&isnumber=4498260.*
Bapat, R.B. "Distance matrix and Laplacian of a tree with attached graphs", Linear Algebra and its Applications 411 (2005) 295-308.*
Agarwal, "Learning Random Walks to Rank Nodes in Graphs", Proceedings of the 24th International Conference on Machine Learning, Corvallis, OR, 2007. pp. 1-8.

(Continued)

*Primary Examiner* — Donald Sparks
*Assistant Examiner* — Ola Olude-Afolabi

(57) ABSTRACT

A method for modeling data affinities and data structures. In one implementation, a contextual distance may be calculated between a selected data point in a data sample and a data point in a contextual set of the selected data point. The contextual set may include the selected data point and one or more data points in the neighborhood of the selected data point. The contextual distance may be the difference between the selected data point's contribution to the integrity of the geometric structure of the contextual set and the data point's contribution to the integrity of the geometric structure of the contextual set. The process may be repeated for each data point in the contextual set of the selected data point. The process may be repeated for each selected data point in the data sample. A digraph may be created using a plurality of contextual distances generated by the process.

20 Claims, 18 Drawing Sheets

OTHER PUBLICATIONS

Zhou, et al., "Spectral Clustering and Transductive Learning with Multiple Views", Proceedings of the 24th International Conference on Machine Learning, Corvallis, OR, 2007. pp. 1-8.

Bandos, et al., "Semi-supervised Hyperspectral Image Classification with Graphs", \NEC Laboratories America (Princeton). pp. 1-4.

Minkov, et al., "Learning to Rank Typed Graph Walks: Local and Global Approaches", Joint 9th WEBKDD and 1st SNA-KDD Workshop '07 (WebKDD/SNAKDD'07), Aug. 12, 2007, San Jose, California, USA. pp. 1-8.

Stepp, et al., "Concepts in Conceptual Clustering"Coordinated Science Laboratory University of Illinois at Urbana-Champaign., pp. 1-3.

Jonyer, et al., "Graph-Based Hierarchical Conceptual Clustering", pp. 1-29.

* cited by examiner

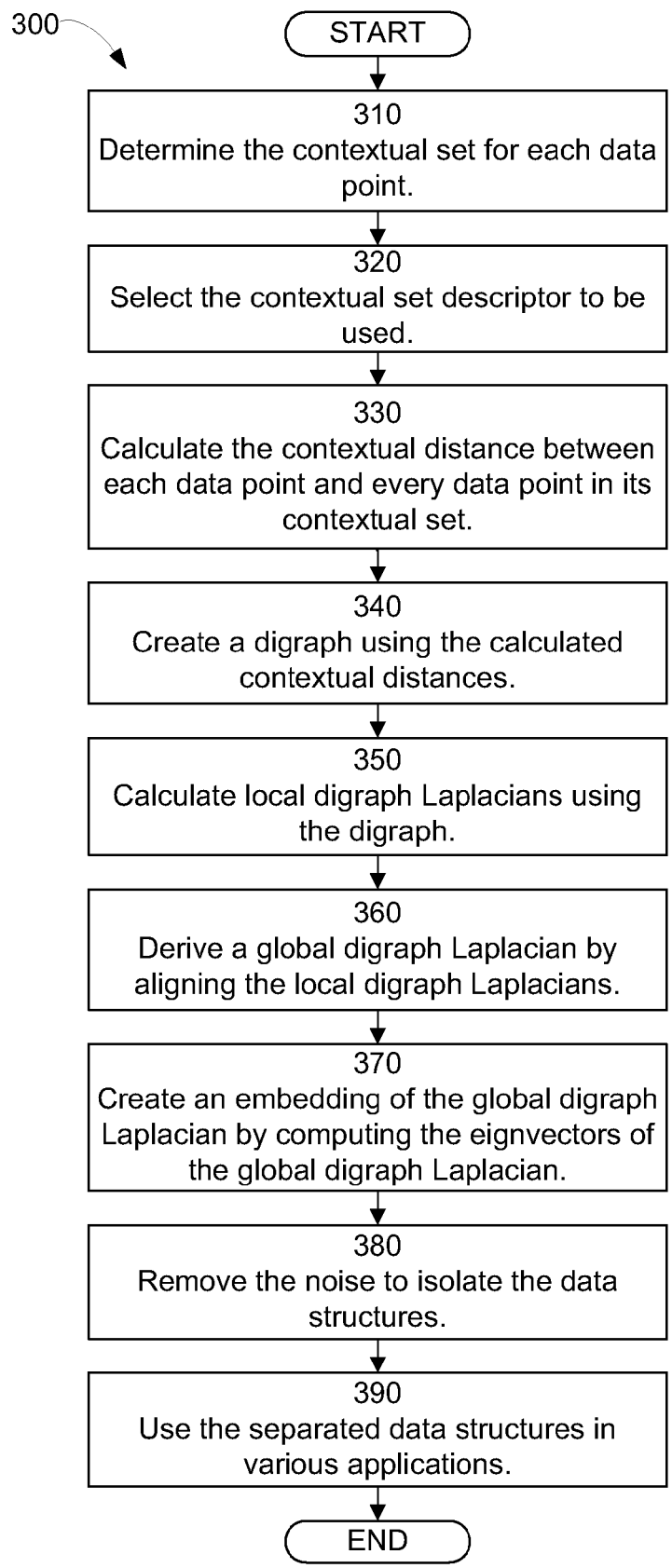

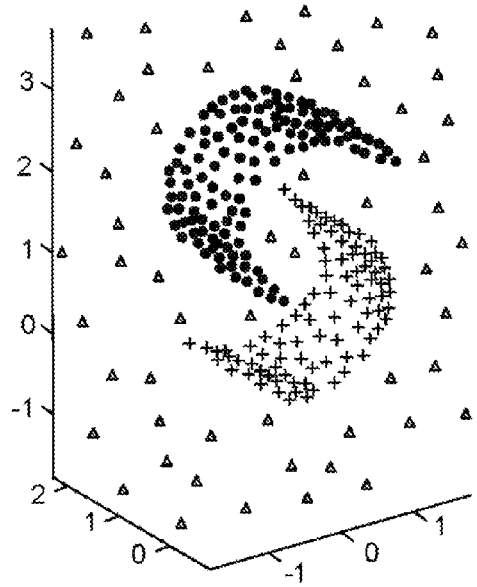 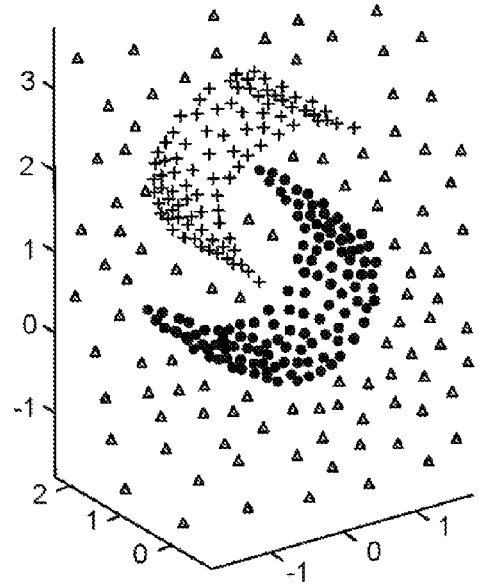
FIG. 8A          FIG. 8B
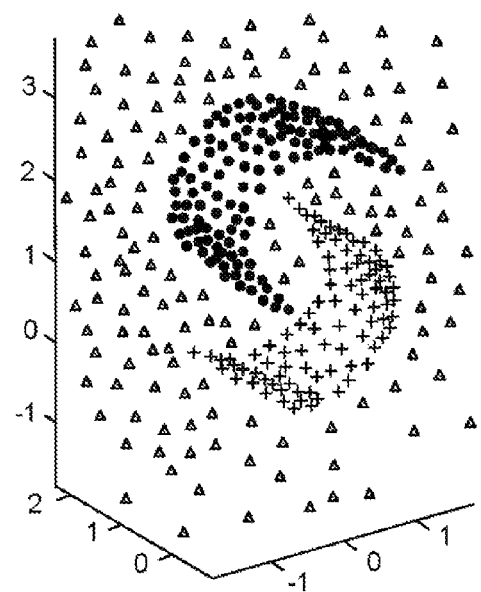
FIG. 8C

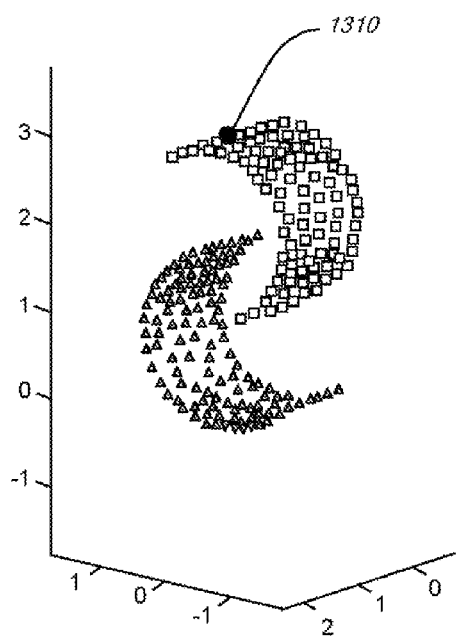
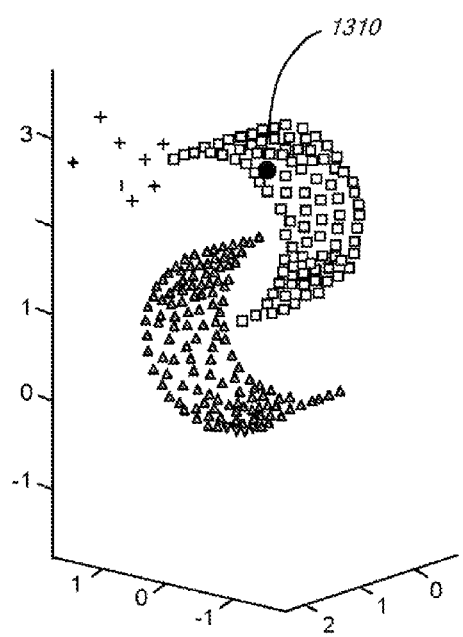
FIG. 13A
FIG. 13B
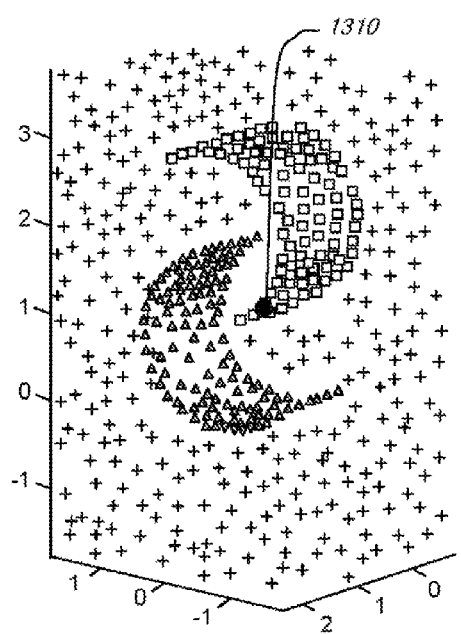
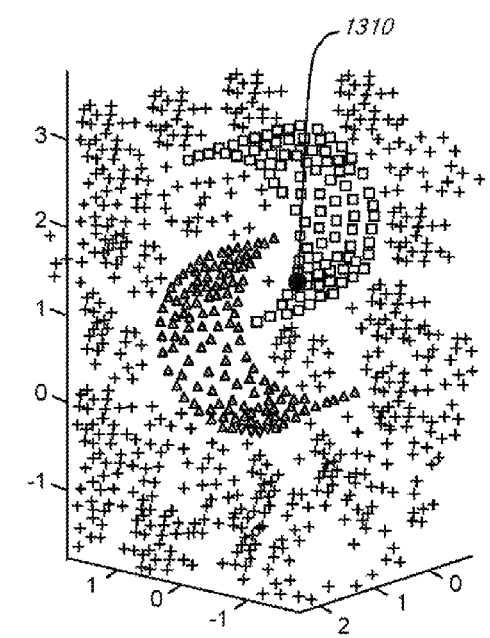
FIG. 13C
FIG. 13D

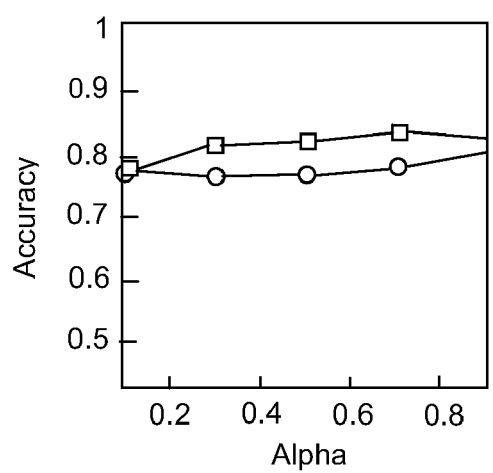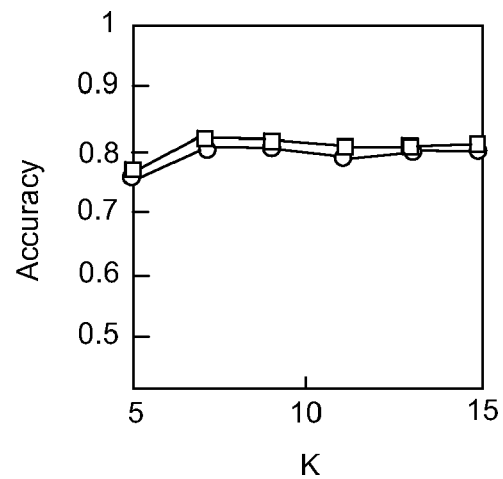
FIG. 14B     FIG. 14C

METHOD FOR MODELING DATA STRUCTURES BY CREATING DIGRAPHS THROUGH CONTEXUAL DISTANCES

CROSS-REFERENCE TO RELATED APPLICATIONS

This application claims benefit of U.S. provisional patent application Ser. No. 60/998,683, filed Oct. 12, 2007, which is incorporated herein by reference.

BACKGROUND

In general, the field of machine learning describes the design and development of algorithms and techniques that allow computers to "learn". A major focus of machine learning research may be to extract information from data automatically. One particular area of machine learning may be concerned with detecting structures in data, which may also be known as structural perception.

Structural perception of data plays a fundamental role in pattern analysis and machine learning. Classical methods to perform structural analysis of data include principal component analysis (PCA) and multidimensional scaling (MDS) which perform dimensionality reduction by preserving global structures of data. Another current method to perform structural analysis of data may be non-negative matrix factorization (NMF) which learns local representations of data. K-means may also be frequently employed to identify underlying clusters in data. The underlying assumption behind the above methods may be that spaces in which data points, or data samples, lie are Euclidean. In other current methods, a non-Euclidean perception of data may be used. Nonlinear structures of data may be modeled by preserving global (geodesic distances for Isomap) or local (locally linear fittings for LLE) geometry of data manifolds. These two methods directed the structural perception of data in manifold ways.

In recent years, spectral graph partitioning has become a powerful tool for structural perception of data. The representative methods may be the normalized cuts for image segmentation and the Ng, Jordan and Weiss (NJW) algorithm for data clustering. For traditional spectral clustering, the structure of data may be modeled by undirected weighted graphs, and underlying clusters are found by graph embeddings. For example, the method may be used to find clusters from spectral properties of normalized weighted adjacency matrices. For semi-supervised structural perception, it may be necessary to detect partial manifold structures of data, given one or more labeled points on data manifolds. Transductive inference (or ranking) may be performed on data manifolds or graph data.

However, existing spectral methods for the structural perception of data may not be robust enough to achieve good results when the structures of data are contaminated by noise points. In addition, structural perception may not be described well in traditional Euclidean based distances. A method for structural analysis of data that may correctly perceive data structures from noisy data may be needed.

SUMMARY

Described herein are implementations of various techniques for modeling data structures. In one implementation, a contextual distance may be calculated between a selected data point in a data sample and a data point in a contextual set of the selected data point. The contextual set may include the selected data point and one or more data points in the neighborhood of the selected data point. The contextual distance may be the difference between the selected data point's contribution to the integrity of the geometric structure of the contextual set and the data point's contribution to the integrity of the geometric structure of the contextual set. A contextual distance may be calculated between the selected data point and each data point in the contextual set of the selected data point. The process may be repeated until each data point in the data sample has been the selected data point. A digraph may then be created using a plurality of contextual distances generated by the above process.

The digraph may be used to calculate local digraph Laplacians. The local digraph Laplacians may be aligned to derive a global digraph Laplacian. A digraph embedding of the global digraph Laplacian may be created by computing one or more eigenvectors of the global digraph Laplacian. Noise data points from the digraph embedding may be removed to isolate the data structures. In addition, the global digraph Laplacian may be used to rank the data points in the data sample and clustering may be performed on feature points in the digraph embedding.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates a flow diagram of a method for modeling data affinities and data structures in accordance with implementations of various techniques described herein.

FIGS. 8A-E illustrate the results of perceptual clustering on the two half-cylinders data in accordance with implementations of various techniques described herein.

FIGS. 12A and 121B illustrate the data spaces corresponding to the feature spaces in the embeddings in FIGS. 11B and 11C, respectively.

FIGS. 13A-E illustrate the results of perceptual ranking on the two half-cylinders data in accordance with implementations of various techniques described herein.

FIGS. 14A-C illustrate the accuracy and stability of perceptual ranking in accordance with implementations of various techniques described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Figure 1A:
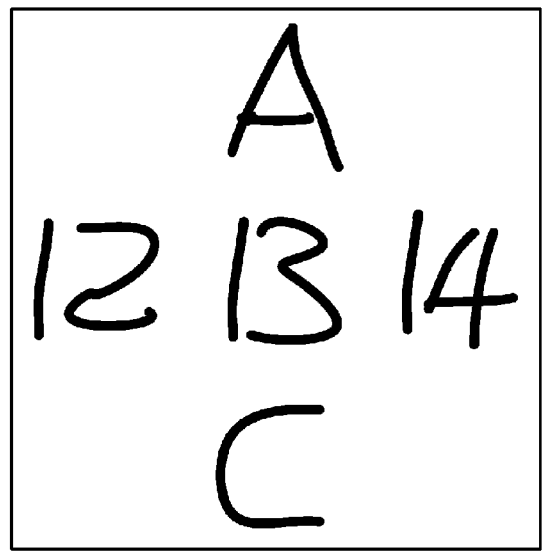
FIGS. 1A-C illustrate that human perception may rely on context.
Figure 1B:
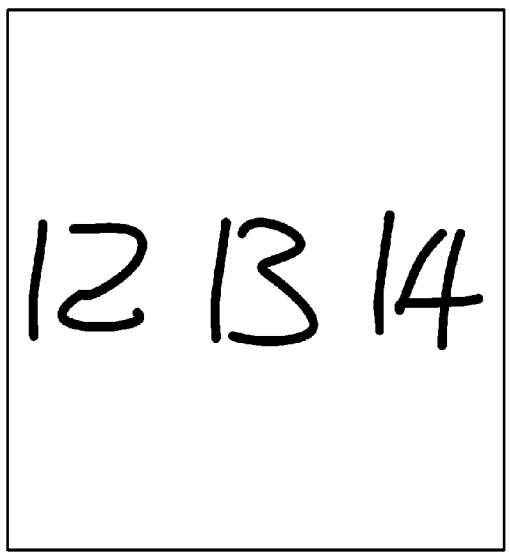
Figure 1C:
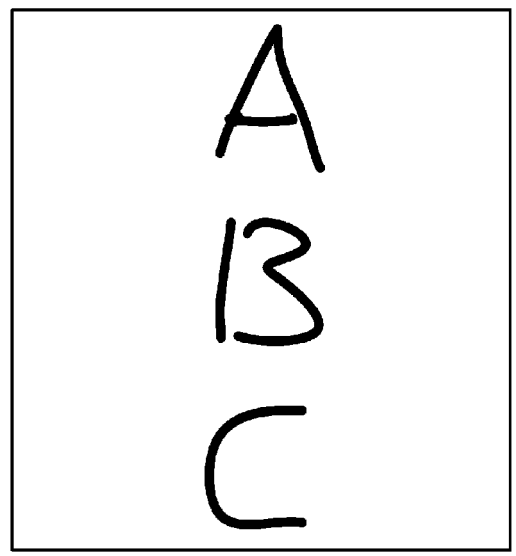

Conventional methods for modeling data structures in data may not accurately separate data structures from noise; however, a method similar to human perception may be more accurate. FIGS. 1A-C illustrate that human perception may rely on context. FIG. 1A illustrates a perceptual problem for the central character in the figure. In FIG. 1B, a human may perceive the central character to be a number "13". In FIG. 1C, a human may perceive the central character to be a letter "B". This implies that the same physical stimulus may be perceived differently in different contexts. This demonstrates that the perceptual relationship between two sample data points heavily relies on the context to which they belong.

The following paragraphs generally describe one or more implementations of various techniques directed to a method for modeling data affinities and data structures in data. First, given a data sample, the contextual set of each data point may be determined. The contextual set of a selected data point may be defined as the selected data point and the data points in the neighborhood of the selected data point. Next, a contextual set descriptor may be selected. The contextual set descriptor may be defined as the structural descriptor of a geometric structure to depict some global structural characteristics. The contextual distance between each data point and every data point in its contextual set may be calculated using the contextual set descriptor. The contextual distance between two data points may be defined by the difference of their contribution to the integrity of the geometric structure of the contextual set. A directed graph (digraph) may be created using the contextual distance to model asymmetry of perception, which is induced by the asymmetry of contextual distances. The edges of the digraph may be weighted based on the contextual distances. The digraph may then be used to calculate local digraph Laplacians. The local digraph Laplacians may be aligned to calculate a global digraph Laplacian. An embedding, which are representations of data in low dimensional Euclidean space, of the global digraph Laplacian may be created by computing the eigenvectors of the global digraph Laplacian. The noise may be removed from the embedding to separate the data structures. The separated data structures may be used in various applications such as recognition and searching. With contextual distances and digraph embeddings, structures of data may be robustly retrieved even when there is heavy noise.

One or more techniques for modeling data affinities and data structures using local contexts in accordance with various implementations are described in more detail with reference to FIGS. 2-14 in the following paragraphs.

Implementations of various techniques described herein may be operational with numerous general purpose or special purpose computing system environments or configurations. Examples of well known computing systems, environments, and/or configurations that may be suitable for use with the various techniques described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various techniques described herein may be implemented in the general context of computer-executable instructions, such as program modules, being executed by a computer. Generally, program modules include routines, programs, objects, components, data structures, etc. that perform particular tasks or implement particular abstract data types. The various techniques described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 2:
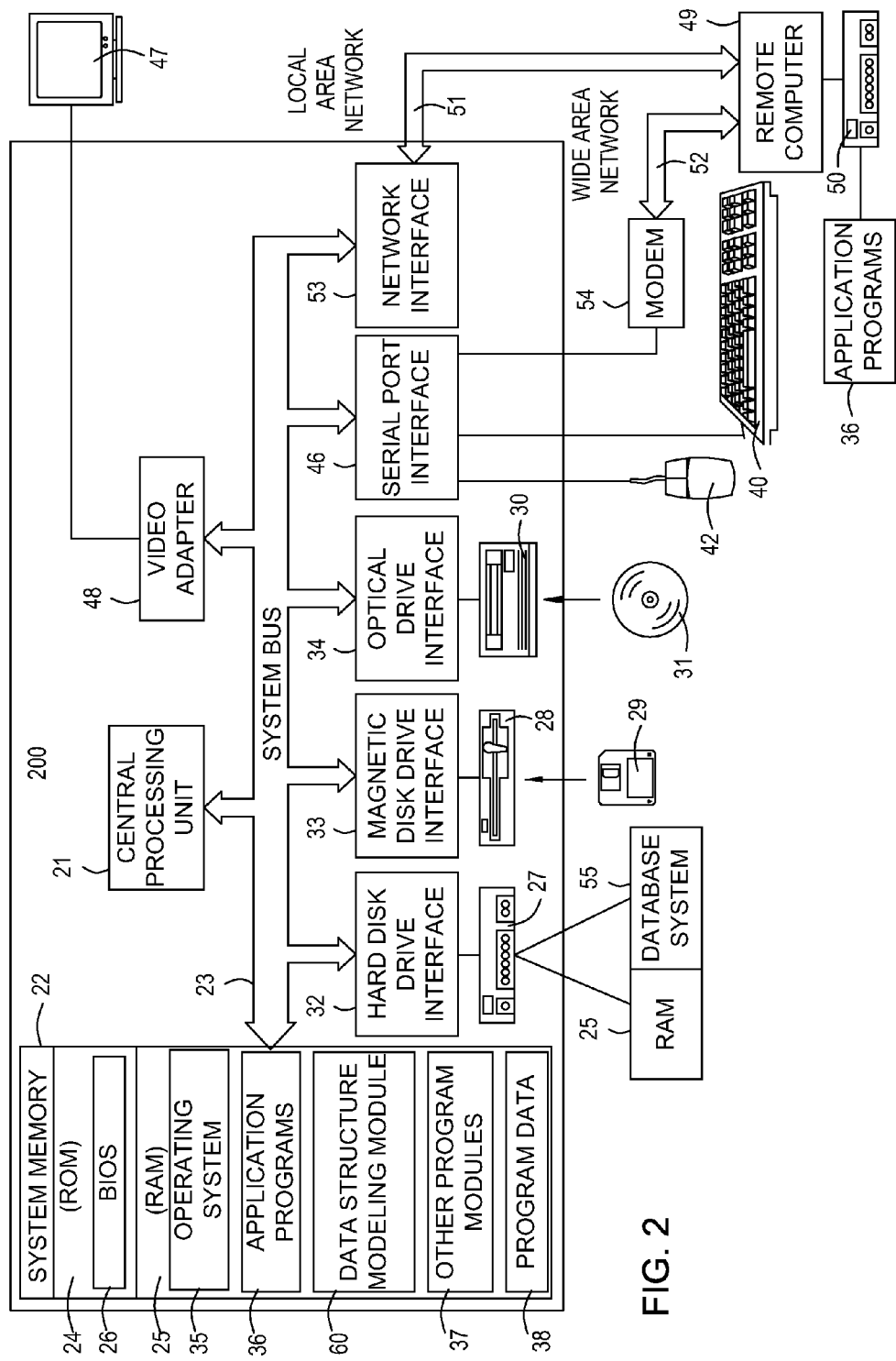
FIG. 2 illustrates a schematic diagram of a computing system in which the various techniques described herein may be incorporated and practiced.

FIG. 2 illustrates a schematic diagram of a computing system 200 in which the various techniques described herein may be incorporated and practiced. Although the computing system 200 may be a conventional desktop or a server computer, as described above, other computer system configurations may be used.

The computing system 200 may include a central processing unit (CPU) 21, a system memory 22 and a system bus 23 that couples various system components including the system memory 22 to the CPU 21. Although only one CPU is illustrated in FIG. 2, it should be understood that in some implementations the computing system 300 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 200, such as during start-up, may be stored in the ROM 24.

The computing system 200 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 200.

Although the computing system 200 is described herein as having a hard disk, a removable magnetic disk 29 and a removable optical disk 31, it should be appreciated by those skilled in the art that the computing system 300 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 200. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 29, optical disk 31, ROM 24 or RAM 25, including an operating system 35, one or more application programs 36, a data structure modeling module 60, program data 38 and a database system 55. The operating system 35 may be any suitable operating system that may control the operation of a networked personal or server computer, such as Windows® XP, Mac OS® X, Unix-variants (e.g., Linux® and BSD®), and the like. The data structure modeling module 60 will be described in more detail with reference to FIGS. 3-14 in the paragraphs below.

A user may enter commands and information into the computing system 200 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 300 may further include other peripheral output devices, such as speakers and printers.

Further, the computing system 200 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, the remote computer 49 may include many or all of the elements described above relative to the computing system 300. The logical connections may be any connection that is commonplace in offices, enterprise-wide computer networks, intranets, and the Internet, such as local area network (LAN) 51 and a wide area network (WAN) 52.

When using a LAN networking environment, the computing system 200 may be connected to the local network 51 through a network interface or adapter 53. When used in a WAN networking environment, the computing system 300 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 300, or portions thereof, may be stored in a remote memory storage device 50. It will be appreciated that the network connections shown are exemplary and other means of establishing a communications link between the computers may be used.

It should be understood that the various techniques described herein may be implemented in connection with hardware, software or a combination of both. Thus, various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

FIG. 3 illustrates a flow diagram of a method 300 for modeling data affinities and data structures in accordance with implementations of various techniques described herein. It should be understood that while the flow diagram indicates a particular order of execution of the operations, in other implementations, the operations might be executed in a different order.

At step 310, the contextual set for each data point may be determined. As described above, the contextual set of a selected data point may be defined as the selected data point and the data points in the neighborhood of the selected data point. Let $S^x=\{x_1, \ldots, x_m\}$ be the set of m sample data points in $R^n$. The contextual set $S_i^x$ of the point $x_i$ may consist of $x_i$ and its nearest neighbors in some distance, e.g. Euclidean distance. The contextual set may be written as $S_i^x=\{x_{i_0}, x_{i_1}, \ldots, x_{i_K}\}$, where $x_{i_j}$ is the j-th nearest neighbor of $x_i$, K is the number of nearest neighbors and $i_0$ is set to $i_0=i$.

At step 320, a contextual set descriptor may be selected. The contextual set descriptor may be user selected or designed into the algorithm. As described above, a contextual set descriptor may be defined as the structural descriptor of a geometric structure to depict some global structural characteristics. The geometric structure of $S_i^x$ may be of interest. A structural descriptor $f(S_i^x)$ of $S_i^x$ may depict some global structural characteristics of $S_i^x$. If a point $x_{i_j}$ complies with the structure of $S_i^x$, then removing $x_{i_j}$ from $S_i^x$ may not affect the structure substantially. In contrast, if the point $x_{i_j}$ is noise or a data point in a different cluster, then removing $x_{i_j}$ from $S_i^x$ may change the structure significantly. Equation 1 may be defined as the contribution of $x_{i_j}$ to the integrity of the structure of $S_i^x$, i.e., the variation of the descriptor with and without $x_{i_j}$:

$$\delta f_{i_j} = |f(S_i^x) - f(S_i^x \setminus \{x_{i_j}\})|, j=0, 1, \ldots, K \quad \text{Equation 1}$$

where | | denotes the absolute value for a scalar and a kind of norm for a vector. The descriptor $f(S_i^x)$ may not be unique. However, $f(S_i^x)$ may need to satisfy the structural consistency among the data points in $S_i^x$, in the sense that $\delta f_{i_j}$ may be relatively small if $x_{i_j}$ is compatible with the global structure formed by sample data points in $S_i^x$ and relatively large if not.

The contextual distance from $x_i$ to $x_{i_j}$ may be defined as $$p(x_i \to x_{i_j}) = |\delta f_i - \delta f_{i_j}|, j=0, 1, \ldots, K \quad \text{Equation 2}$$

where the notation $\to$ emphasizes that the distance is in the direction from $x_i$ to $x_{i_j}$. As such, $p(x_i \to x_{i_j}) \geq 0$ and the equality holds if $j=0$. The contextual distance $p(x_i \to x_{i_j})$ defined above may be consistent with the concept that context influences structural perception. The set $S_i^x$, consisting of the point $x_i$ and its nearest neighbors $\{x_{i_0}, x_{i_1}, \ldots, x_{i_K}\}$, may be taken as the context for computing the distances from $x_i$ to its neighbors. The relative perception may be modeled by investigating how much the structure of $S_i^x$ changes by removing a point from $S_i^x$. It should be noted that the contextual distance defined in Equation 2 may be asymmetric because $p(x_i \to x_{i_j})$ may not necessarily be equal to $p(x_{i_j} \to x_i)$, and in the extreme case $x_i$ may even not be in the contextual set of $x_{i_j}$. The contextual distance may heavily rely on the structural characteristic of the contextual set.

The following may be some examples of contextual set descriptors which may be applied for computing the contextual distances. First, the contextual set descriptor may be a trivial descriptor where the Euclidean distance may be a special case of contextual distance. In this case, $K=1$ and $f(S_i) = \gamma x_i + (1-\gamma) x_{i_1}$, where $\lambda < 0$ or $\gamma > 1$. The norm in Equation 1 may be the Euclidean norm $\|\,\|$. It may be verified that $p(x_i \to x_{i_j}) = \|x_i - x_{i_j}\|$. Therefore, the contextual distance may coincide with the Euclidean distance in this special case.

Next, the contextual set descriptor may be a geometric descriptor, such as a centroid. Let $K>1$ and $x_i(S_i^x)$ denote the centroid of $S_i^x$, i.e., $$x_i(S_i^x) = \frac{1}{K+1} \sum_{j=0}^{K} x_{i_j} \cdot x_i(S_i^x)$$

may be a type of simple globally geometric characterization of $S_i^x$. Removing $x_{i_j}$ may cause relatively larger shifting of the centroid than the other elements in $S_i^x$ if it is not compatible with the underlying global structure of $S_i^x$. So an alternative descriptor of the set may be $f(S_i^x) = x_i(S_i^x)$, which is a vector-valued descriptor.

Another example of a contextual set descriptor may be an informative descriptor, such as coding length. The coding length $L(S_i^x)$ of a vector-valued set $S_i^x$ may be the intrinsic structural characterization of the set. $L(S_i^x)$ may be exploited as a kind of scalar-valued descriptor of $S_i^x$, i.e. $f(S_i^x) = L(S_i^x)$. $L(S_i)$ may be defined as follows. Let $X_i = [x_{i_0}, x_{i_1}, \ldots, x_{i_K}]$ and $$\bar{x}_i = \frac{1}{K+1} X_i e,$$

where $e$ is the $K+1$ dimensional all-one vector. Then, the matrix of centered points may be written as $\bar{X}_i = X_i - \bar{x}_i e^T$, where T denotes the transpose of a matrix. The total number of bits needed to code $S_i$ may be $$L(S_i) = \quad \text{Equation 3}$$

$$\frac{K+1+n}{2} \log \det\left(I + \frac{n}{\varepsilon^2(K+1)} \bar{X}_i \bar{X}_i^T\right) + \frac{n}{2} \log\left(1 + \frac{\bar{x}_i^T \bar{x}_i}{\varepsilon^2}\right)$$

where $\det(\,)$ is the determinant operation and $\epsilon$ the allowable distortion. In fact, the computation may be considerably simplified by the following identity:

$$\det\left(I + \frac{n}{\varepsilon^2(K+1)} \bar{X}_i \bar{X}_i^T\right) = \det\left(I + \frac{n}{\varepsilon^2(K+1)} \bar{X}_i^T \bar{X}_i\right) \quad \text{Equation 4}$$

in the case of $K+1 \ll n$. The allowable distortion $\epsilon$ in $L(S_i^x)$ may be a free parameter and $L(S_i^x)$ may not be very sensitive to the choice of $\epsilon$. $\epsilon$ may be empirically chosen as $$\varepsilon = \sqrt{\frac{10n}{K}}.$$

At step 330, the contextual distance between each data point and every data point in its contextual set may be calculated. As mentioned above, the contextual distance between two data points may be defined by the difference of their contribution to the integrity of the geometric structure of the contextual set. Contextual distance may only be defined within contextual sets of data points. Typical Euclidean distance measures the distance between two data points and is symmetric in that the distance from point A to point B is the same as the distance from point B to point A. Contextual distance may be asymmetric in that the distance from point A to point B may not equal the distance from point B to point A. This occurs because different contextual sets of different points may be considered in the contextual distance computation. In this manner, the contextual distance defined here may be a kind of dissimilarity instead of a formal distance in the mathematical sense.

Figure 4A:
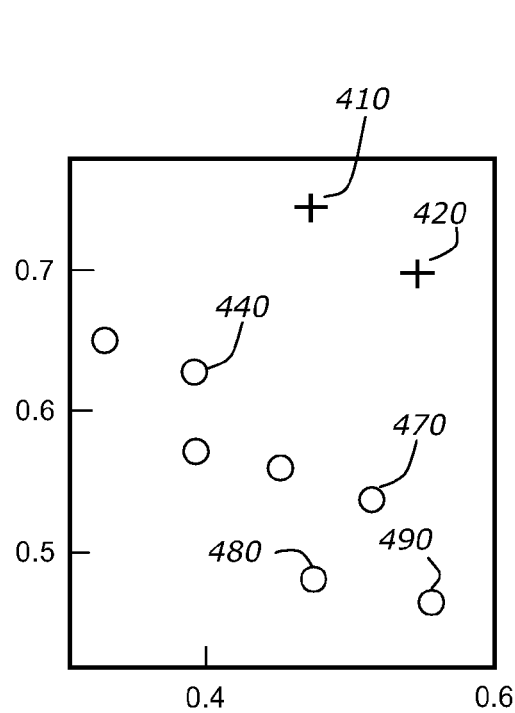
FIGS. 4A-F illustrate an example of contextual distance as compared to Euclidean distance in accordance with implementations of various techniques described herein.
Figure 4B:
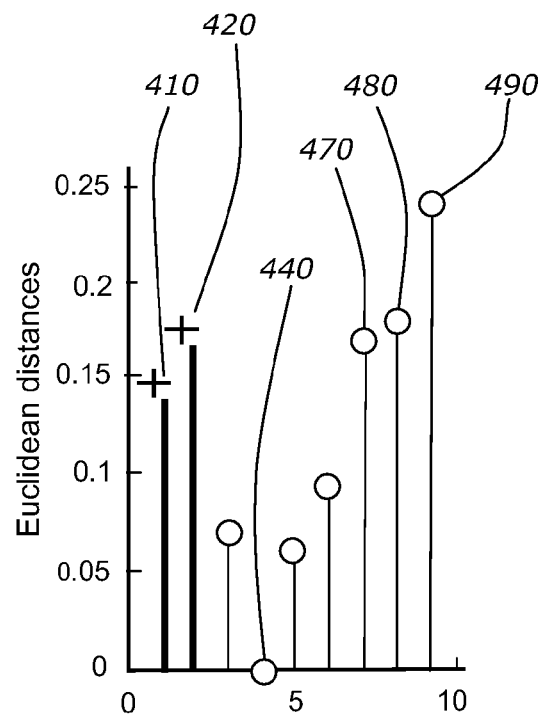
Figure 4C:
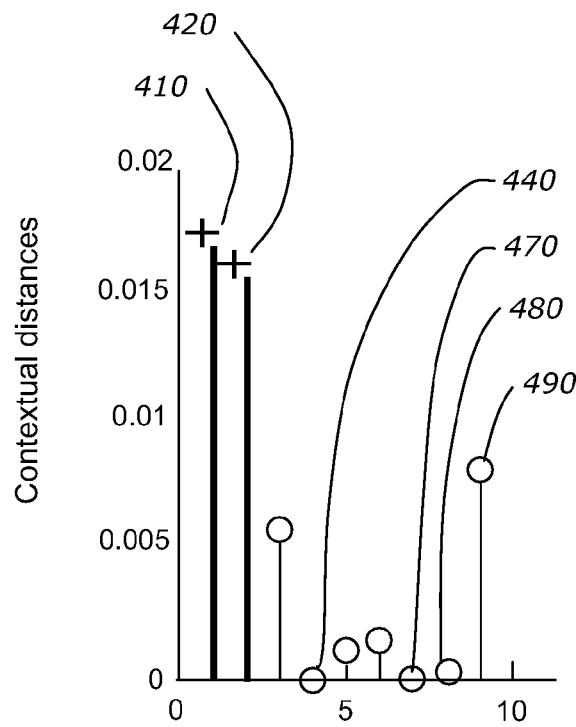
Figure 4D:
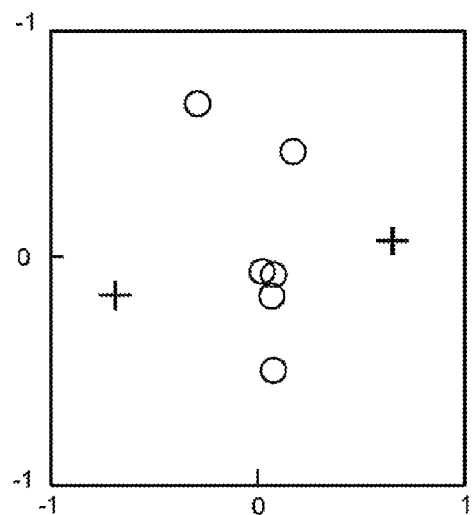
Figure 4E:
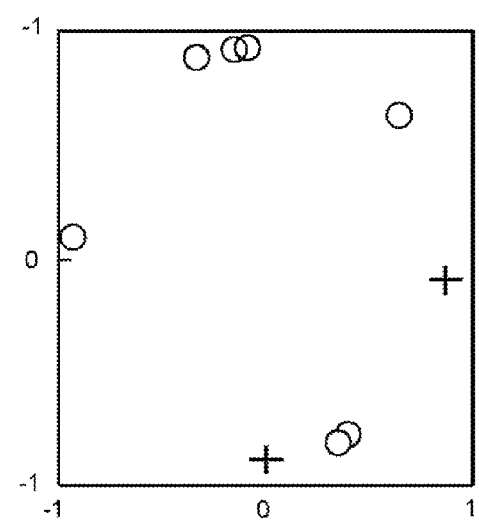

FIGS. 4A-F illustrate an example of contextual distance as compared to Euclidean distance in accordance with implementations of various techniques described herein. FIG. 4A shows a simple data sample of nine data points. The structure of the data clearly consists of two clusters identified by 'o' markers (Cluster I) and '+' markers (Cluster II). FIG. 4B illustrates the Euclidean distances between the data point 440 and the other data points. The Euclidean distances between data point 440 and data points 470, 480 and 490 in Cluster I may be larger than those between data point 440 and data points 410 and 420 in Cluster II. FIGS. 4D and 4E illustrate the results of using the Euclidean distances in the NJW clustering method and the normalized cuts method respectively. The two distinct data clusters may be mixed using either method. The Euclidean-based distances between two data points may not accurately capture the data structure.

Figure 4F:
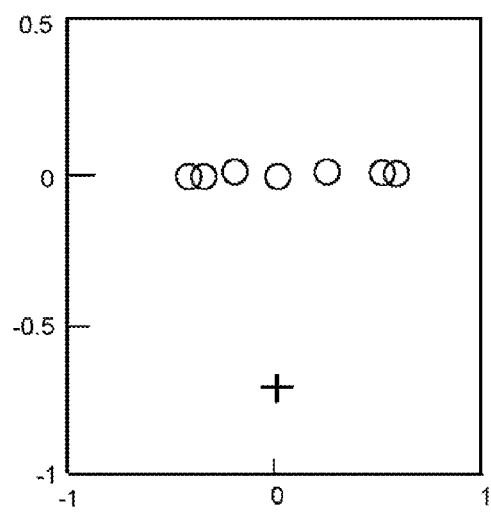

However, FIG. 4C illustrates the contextual distances from data point 440 to the other data points. The contextual distances from data point 440 to data points 410 and 420 in Cluster II may be much larger than the contextual distances to the data points in Cluster I including data points 470, 480 and 490. FIG. 4F illustrates the 2-D representation of the data using contextual distances. Cluster I and Cluster II are well separated now and clearly distinguishable. In essence, contextual distances model human perception. In FIG. 4A, consider the perceptual relationship between data point 410 and the 'o' markers making up Cluster I. Using human perception, Cluster I may be a set of data points with a consistent global structure and data point 410 may be noise, or an outlier, with respect to Cluster I when compared to the underlying structure of data point 410 and Cluster I. Human perception retrieves structural information of data point 410 by taking Cluster I as a reference. Therefore, structural perception may be relative and context-based. A data point itself may not be an outlier, but it may be an outlier when its neighboring data points are taken as reference. Thus, the set of contextual data points may be taken into account in order to compute distances compatible with the mechanism of human perception.

At step 340, a digraph may be created using the calculated contextual distances. The digraph may be made up of many data points that may be directionally linked and weighted. Any given pair of data points may be linked in both directions; however, the weights may be different for each direction such that the digraph may be asymmetric. The edges of the digraph may be weighted based on the contextual distances. A digraph for S may be built. Each point in S may be a vertex of the digraph. A directed edge may be positioned from $x_i$ to $x_j$ if $x_j$ is one of the K nearest neighbors of $x_i$. The weight $w_{i \to j}$ of the directed edge may be defined as $$w_{i \to j} = \begin{cases} e^{-\frac{[p(x_i - x_j)]^2}{\sigma^2}} \\ 0 \end{cases} \qquad \text{Equation 5}$$

where $x_j$ is the nearest neighbor of $x_i$ and where $\to$ denotes that the vertex i points to the vertex j, and $\sigma$ is a free parameter. To estimate $\sigma$ in Equation 5, suppose that $\{p_1, \ldots, p_s\}$ may be the s contextual distances that may be randomly selected from r local contexts (r points along with their nearest neighbors). Then, $s=r(K+1)$. Let $$\bar{p} = \frac{1}{s}\sum_{i=1}^{s} p_i \text{ and } \sigma_p = \left(\frac{1}{s}\sum_{i=1}^{s}(p_i - \bar{p})^2\right)^{\frac{1}{2}}.$$

The estimator of $\sigma$ is given by $\sigma = \bar{p} + 3\sigma_p$.

Figure 5A:
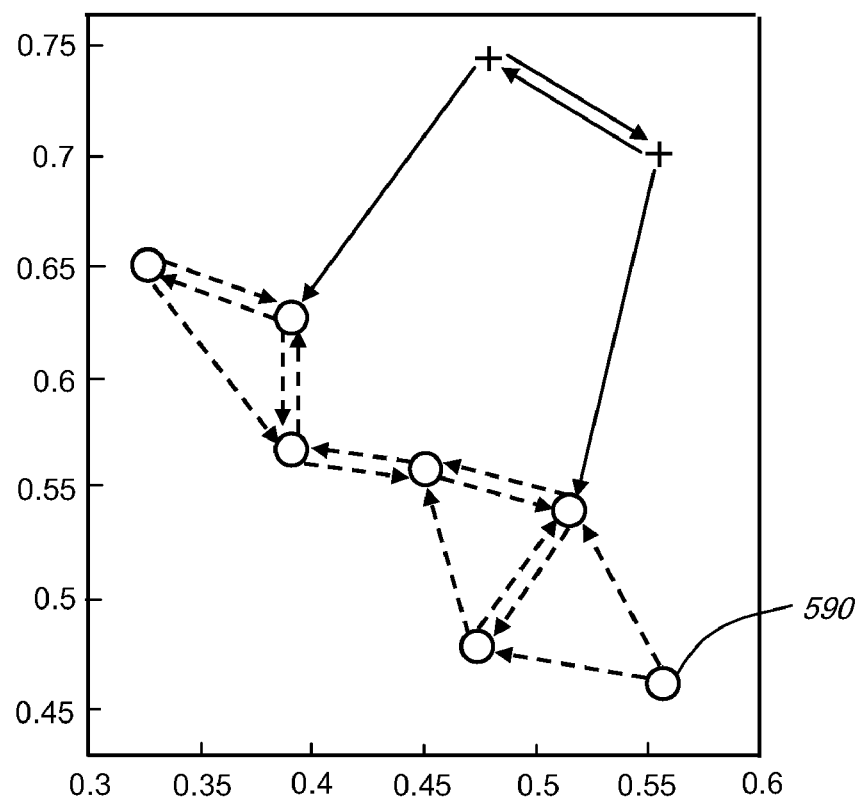
FIGS. 5A-B illustrate a digraph and associated weighted adjacency matrix in accordance with implementations of various techniques described herein.
Figure 5B:
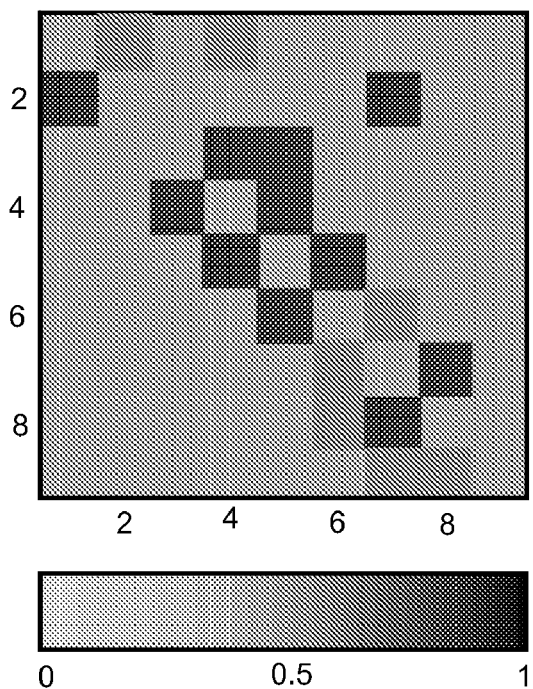

The direction of the edge from $x_i$ to $x_j$ may arise because the distance between $x_i$ to $x_j$ may be asymmetric. Locally, the point $x_i$ may be connected to its nearest neighbors by a K-edge directed star ($_K$-distar). Hence, the induced digraph on the data may be composed of m K-distars. Let $W \in R^{m \times m}$ denote the weighted adjacency matrix of the weighted digraph, i.e., $W(i,j)=w_{i \to j}$. W may be asymmetric. The structural information of the data may be embodied by the weighted digraph, and data mining reduces to mining the properties of the digraph. FIGS. 5A-B illustrate a digraph and associated weighted adjacency matrix in accordance with implementations of various techniques described herein. FIG. 5A illustrates a simple induced digraph on the data from FIG. 4A. FIG. 5B illustrates the asymmetry of the associated weighted adjacency matrix, W. The darker areas correspond to higher weights and the lighter areas correspond to lower weights.

At step 350, the local digraph Laplacians may be calculated using the digraph. When the data are modeled by a digraph, data processing may be reduced to mining the properties of the digraph. In general, the properties of a digraph may be contained in the structure of the global digraph Laplacian. Therefore, the global digraph Laplacian may be derived by the alignment of local digraph Laplacians defined on local data patches. In one implementation, the local digraph Laplacians may be calculated using the functionals defined on the digraph.

The local digraph Laplacians may be calculated as follows. Let $\{x_{i_0}, x_{i_1}, \ldots, x_{i_K}\}$ be the neighborhood of $x_i$, the i-th data patch, and the index set be $I_i=\{i_0, i_1, \ldots, i_K\}$, where $i_0=i$. Suppose that $\tilde{Y}_i=[\tilde{y}_{i_1}, \ldots, \tilde{y}_{i_K}]$ may be a kind of representation yielded by the digraph embedding. The local weighted adjacency matrix $W_i$ may be a sub-matrix of W: $W_i=W(I_i, I_i)$. The local transition probability matrix $P_i$ of the random walk on the local digraph may be given by $P_i=D_i^{-1}W_i$, where $D_i(u,u)=\Sigma_v W_i(u,v)$ and zeros elsewhere. The corresponding stationary distribution vector $\pi_i$ may be the left eigenvector of $P_i$ corresponding to 1, i.e. $\pi_i^T P_i = \pi_i$ and $\|\pi_i\|_1 = 1$. Also, let $$\Phi_i(u,u) = \frac{\pi_i(u)}{(\pi_i^T e)}$$

and zeros elsewhere, where e is the all-one vector. An energy function on the global digraph may be defined as the following:

$$R(\tilde{Y}) = \frac{\sum_{i=1}^{m} \alpha_i}{\sum_{i=1}^{m} \beta_i} \qquad \text{Equation 6}$$

where $$\alpha_i = \frac{1}{2}\sum_{u,v=0}^{K} \|\tilde{y}_{i_u} - \tilde{y}_{i_v}\|^2 P_i(u,v), \text{ and} \qquad \text{Equation 7}$$

$$\beta_i = \sum_{v=0}^{K} \|\tilde{y}_{i_v}\|^2 \pi_i(u) \qquad \text{Equation 8}$$

With simple manipulations, it may be determined that $\alpha_i = \text{tr}(\tilde{Y}_i L_i \tilde{Y}_i^T)$ and $\beta_i = \text{tr}(\tilde{Y}_i \Phi_i \tilde{Y}_i^T)$, where $$L_i = \Phi_i - \frac{\Phi_i P_i + P_i^T \Phi_i}{2} \qquad \text{Equation 9}$$

may be the local digraph combinatorial Laplacian defined on the i-the local patch and $\Phi_i = \text{diag}(\pi_i)$.

At step 360, a global digraph Laplacian may be derived by aligning the local digraph Laplacians. To do so, let $\tilde{Y}=[\tilde{y}_1, \ldots, \tilde{y}_m]$. Thus, $\tilde{Y}_i = \tilde{Y}S_i$, where $S_i$ is a binary selection matrix. Thus, $$\alpha = \sum_{i=1}^{m} \alpha_i = \sum_{i=1}^{m} tr(\tilde{Y}S_i L_i S_i^T \tilde{Y}^T) = tr(\tilde{Y} \tilde{L} \tilde{Y}^T) \qquad \text{Equation 10}$$

where $$\tilde{L} = \sum_{i=1}^{m} S_i L_i S_i^T \qquad \text{Equation 11}$$

Also, $$\beta = \sum_{i=1}^{m} \beta_i = tr(\tilde{Y}\tilde{\Phi}\tilde{Y}^T),$$

where $$\tilde{\Phi} = \sum_{i=1}^{m} S_i \Phi_i S_i^T.$$

Thus, $R(\tilde{Y})$ may be written in the Rayleigh quotient as $$R(\tilde{Y}) = \frac{tr(\tilde{Y}\tilde{L}\tilde{Y}^T)}{tr(\tilde{Y}\tilde{\Phi}\tilde{Y}^T)} = \frac{tr(YLY^T)}{tr(YY^T)} \quad \text{Equation 12}$$

where $$Y = \tilde{Y}\tilde{\Phi}^{\frac{1}{2}}$$

is the embedding and $$L = \tilde{\Phi}^{-\frac{1}{2}}\tilde{L}\tilde{\Phi}^{-\frac{1}{2}}$$

is the global digraph Laplacian.

The global Laplacian may be defined in a different, perhaps simpler manner. The global transition probability matrix P may be defined as $P=D^{-1}W$, where $D(u,u)=\Sigma_v W(u,v)$ and zeros elsewhere. The stationary distribution of the random walk on the global digraph be $\pi$ may be obtained by $\pi^T P = \pi^T$. Let $$\Phi_i(u, u) = \frac{\pi_i(u)}{(\pi_i^T e)}$$

and zeros elsewhere. Thus the global digraph Laplacian may be formed by minimizing, $$R(\tilde{Y}) = \frac{\frac{1}{2}\sum_{u,v=0}^{m} \|\tilde{y}_u - \tilde{y}_v\|^2 \pi(u) P(u,v)}{\sum_{v=0}^{m} \|\tilde{y}_v\|^2 \pi(u)}. \quad \text{Equation 13}$$

Equation 13 may be simplified by algebra to $$R(Y) = \frac{tr(YLY^T)}{tr(YY^T)},$$

where the Laplacian matrix $L=I-\Theta$ and where $$\Theta = \frac{\Phi^{\frac{1}{2}}P\Phi^{-\frac{1}{2}} + \Phi^{-\frac{1}{2}}P^T\Phi^{\frac{1}{2}}}{2}. \quad \text{Equation 14}$$

At step 370, an embedding of the global digraph Laplacian may be created by computing the eigenvectors of the global digraph Laplacian. An embedding of the global digraph Laplacian may project the data structures from the data space into the feature space. $Y^T$ may correspond to the c eigenvectors of the global Laplacian L associated with the c smallest nonzero eigen-values. Alternatively, the columns of $Y^T$ may also be the c non-constant eigenvectors of $\Theta$ associated with the c largest eigen-values. Note that for digraphs modeled by this method, there may exist nodes that have no in-links. In-links may be depicted by arrows pointing toward the node. For example, the bottom node 590 of the digraph in FIG. 5A has no in-links, as depicted by the fact that no arrows are pointing to the node. Thus the elements in the corresponding column of the weighted adjacency matrix in FIG. 5B may be all zeros. Such dangling nodes may not be visited by random walkers. This issue may be circumvented by adding a perturbation matrix to the transition probability matrix, $$P \leftarrow \beta P + (1-\beta)\frac{1}{m}ee^T,$$

where e is an all-one vector and $\beta \in [0,1]$.

Figure 6A:
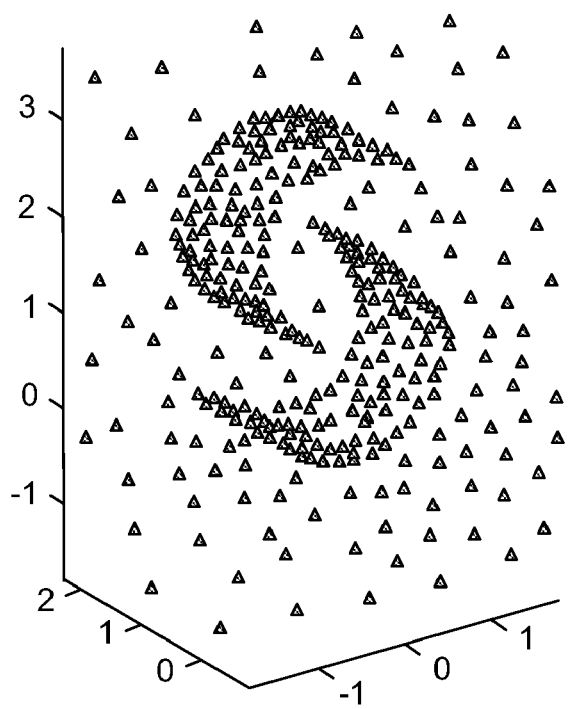
FIGS. 6A-B illustrate sample data consisting of data points forming three data classes, two half-cylinders and noise in accordance with implementations of various techniques described herein.
Figure 6B:
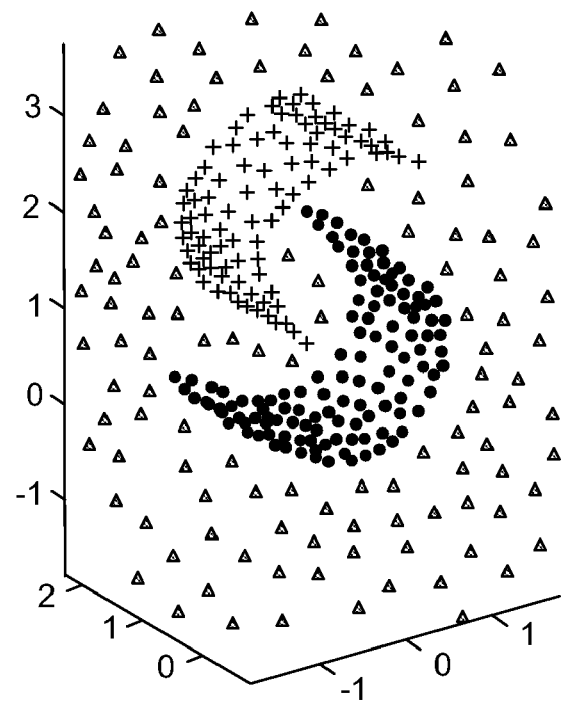
Figure 7A:
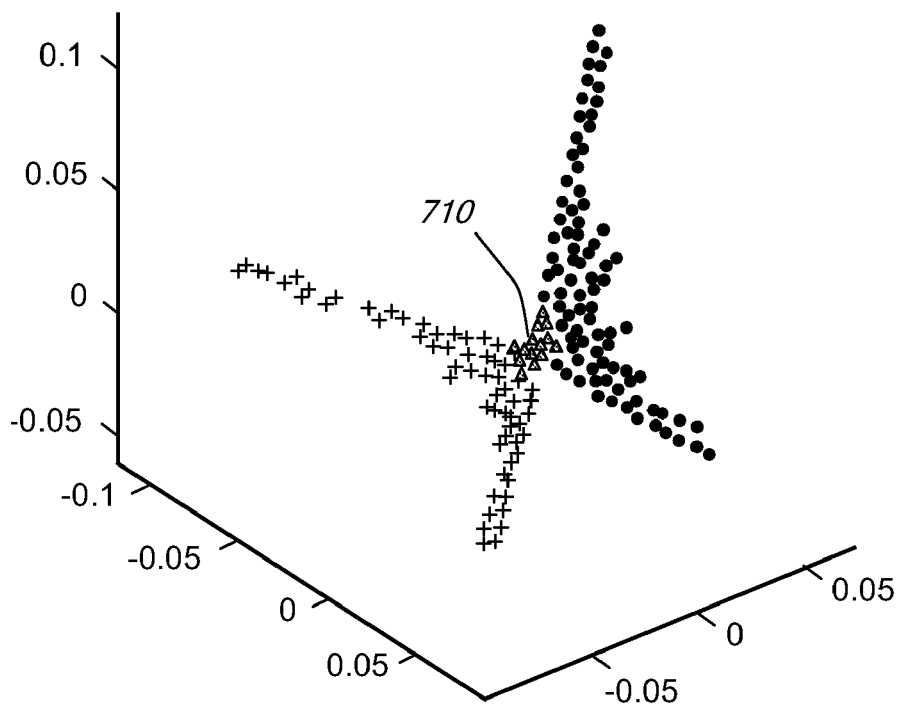
FIGS. 7A-B illustrate the embeddings of the two half-cylinders and noise data of FIG. 6A in the perceptual feature space in accordance with implementations of various techniques described herein.
Figure 7B:
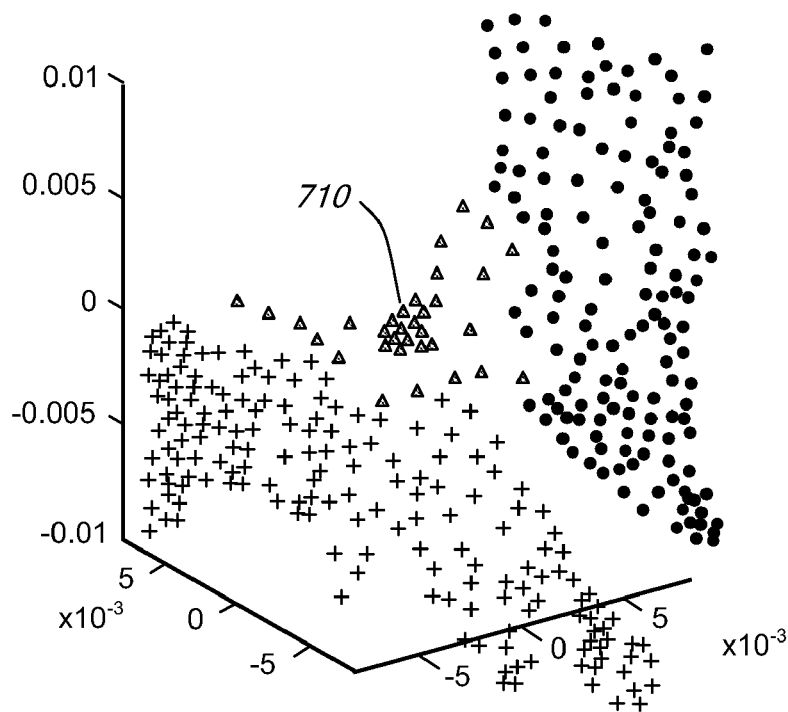

At step 380, the noise may be removed to isolate the data structures. Noise or outlying data points may be naturally mapped near the origin in the perceptual feature space of the embedding such that the noise points may be identified as the data points near the origin. Thus the data may be separated by data structure, or data class, and noise, or outliers. FIGS. 6A-B illustrate sample data consisting of data points forming three data classes, two half-cylinders and noise in accordance with implementations of various techniques described herein. FIG. 6A illustrates sample data. FIG. 6B illustrates that the sample data may be correctly perceived as three classes of data, two separate surfaces forming two half-cylinders depicted with "+" symbols (top half) and "•" symbols (bottom half) and a set of noise points depicted with grey triangles. FIGS. 7A-B illustrate the embeddings of the two half-cylinders and noise data of FIG. 6A in the perceptual feature space in accordance with implementations of various techniques described herein. FIG. 7A illustrates the 3-D representation of the data. The data points corresponding to the two half-cylinders are separated and depicted with "+" symbols (lower left) and "•" symbols (upper right). The data points corresponding to the noise are at the origin 710 and depicted with grey triangles. FIG. 7B illustrates a zoom-in view of the origin. The noise data points at the origin 710 may be removed to isolate the data structures, the data points corresponding to the two half-cylinders.

Figure 8D:
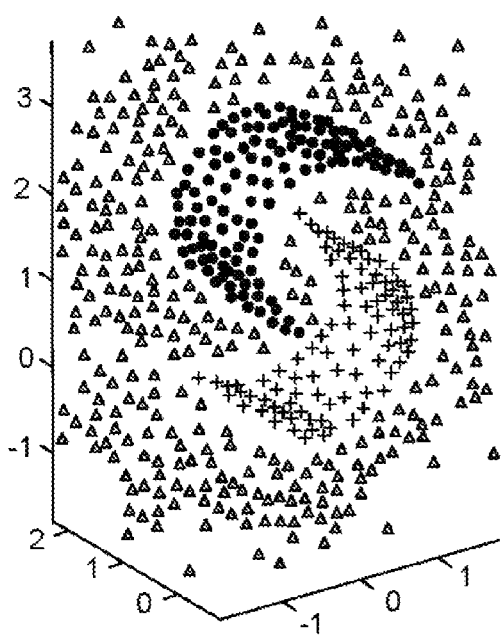
Figure 8E:
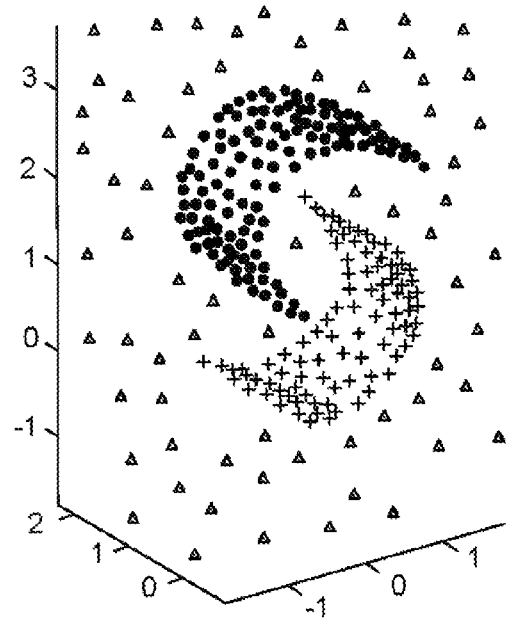

At step 390, the isolated data structures may be used in various applications such as clustering and ranking. In one implementation, a perceptual clustering algorithm may consist of modeling the digraph of the data and forming $\Theta$ in Equation 14. Then computing the c eigenvectors $\{y_2, \ldots, y_{c+1}\}$ of $\Theta$ corresponding to the first c largest eigen-values except the largest one. These eigenvectors form a matrix $Y=[y_2, \ldots, y_{c+1}]$. The row vectors Y may be the mapped feature points of the data. The clustering may now be performed on the feature points. In one implementation, the clustering may be performed on feature points in the embedding spaces. FIGS. 8A-E illustrate the results of perceptual clustering on the two half-cylinders data in accordance with implementations of various techniques described herein. FIGS. 8A-D illustrate the results of perceptual clustering using the coding length contextual set descriptor on the two half-cylinders data with increasing noise data points, 400, 800, 1200 and 1600 noise data points, respectively. FIG. 8E illustrates the results of perceptual clustering using the centroid contextual set descriptor on the two half-cylinders data. The perceptual clustering accurately detects the data structures regardless of the noise. The results of FIGS. 8A-E may be compared to the results using conventional methods depicted in FIGS. 9A-C described below.

Figure 9A:
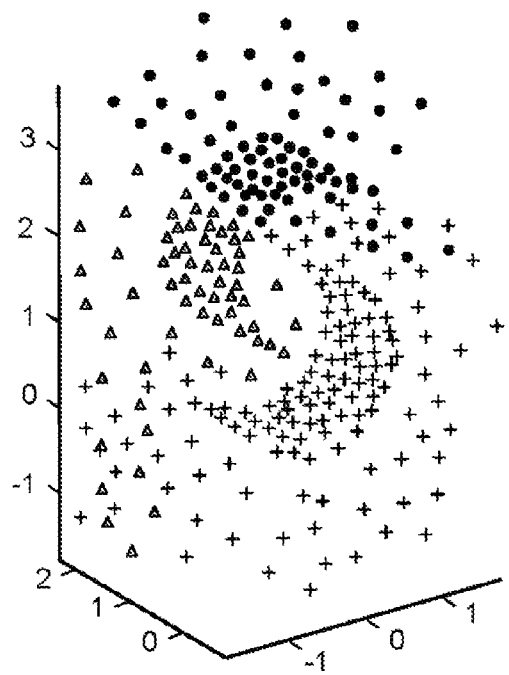
FIGS. 9A-C illustrate the limitations of existing methods for modeling data structures in data.
Figure 9B:
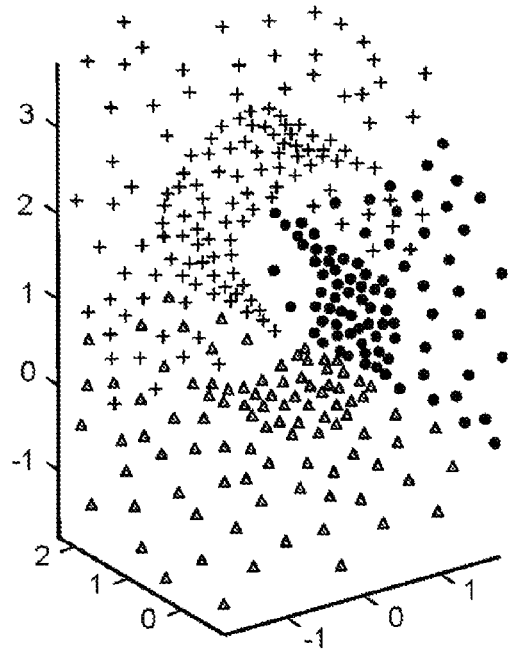
Figure 9C:
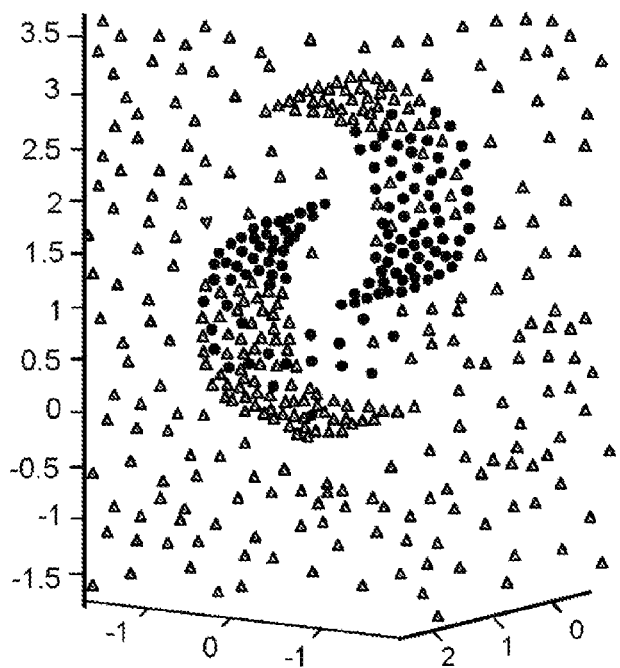
Figure 10A:
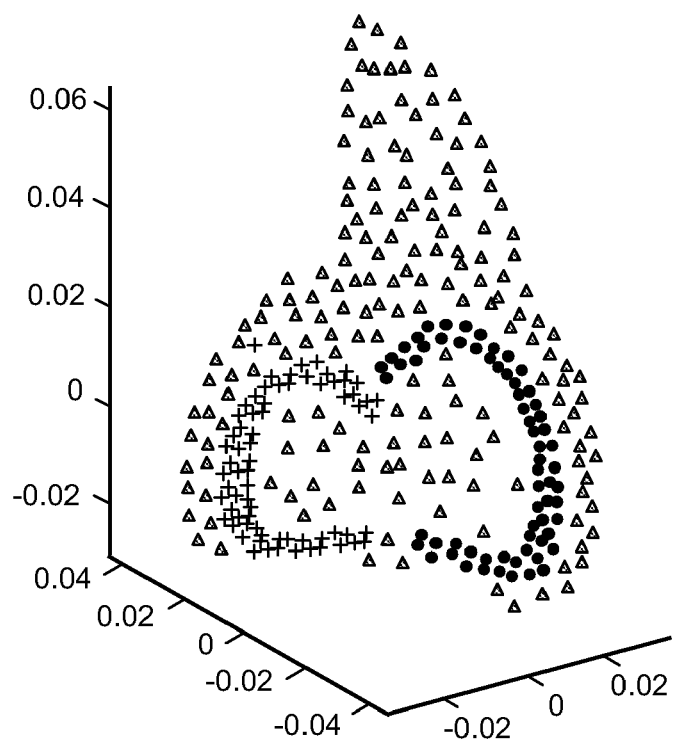
FIGS. 10A-B illustrate the computer structural analysis of the two half-cylinders and noise data of FIG. 6A in embeddings using current methods.
Figure 10B:
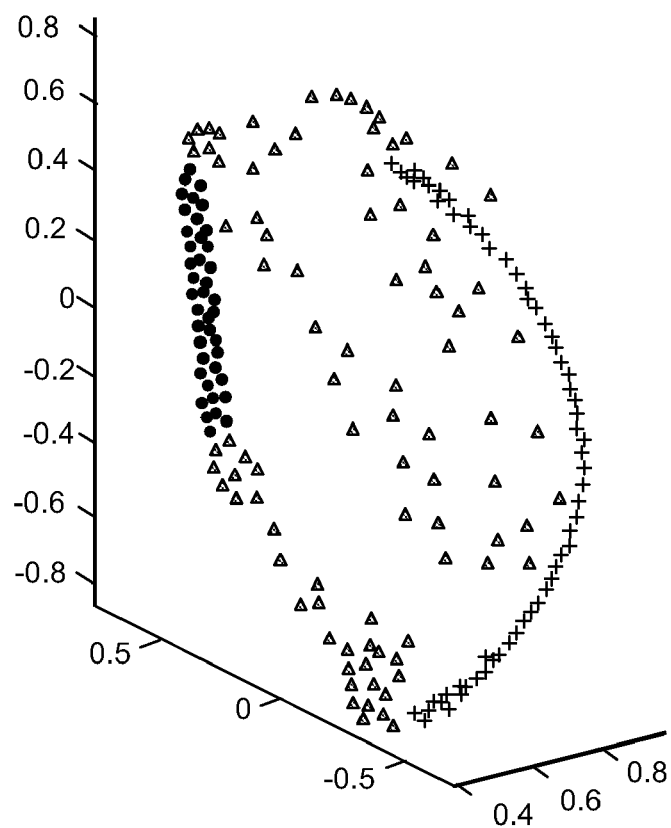

FIGS. 9A-C illustrate the limitations of existing methods for modeling data structures in data. FIG. 9A illustrates the computer structural analysis of the data using the current NJW clustering algorithm. FIG. 9B illustrates the computer structural analysis of the data using the normalized cuts method. FIG. 9C illustrates the computer structural analysis of the data using the transductive interference method. These current methods all fail to detect the underlying clusters of the data in the noise. In each of FIGS. 9A-C, the data was separated into three classes of data as depicted by the "+" symbol, "•" symbol and grey triangles; however, the three classes of data were inaccurately separated. FIGS. 10A-B illustrate the computer structural analysis of the two half-cylinders and noise data of FIG. 6A in embeddings using current methods. FIG. 10A illustrates an embedding produced by three eigenvectors used in NJW clustering. FIG. 10B illustrates an embedding produced by three eigenvectors used in normalized cuts. As shown in FIGS. 10A-B, these two methods may not accurately separate the three classes of data, the two separate surfaces forming two half-cylinders and noise points.

Figure 11A:
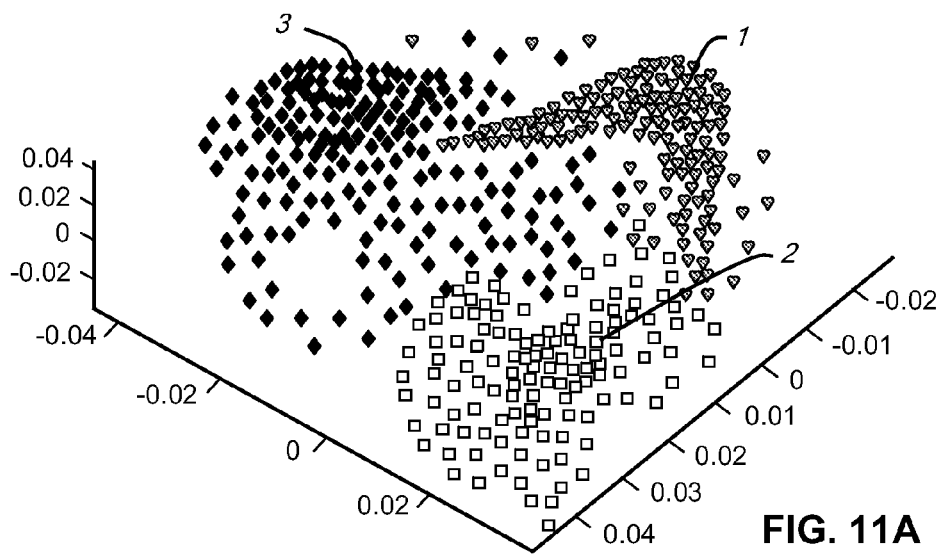
FIGS. 11A-C illustrate the embeddings of the handwritten digits clustering.
Figure 11B:
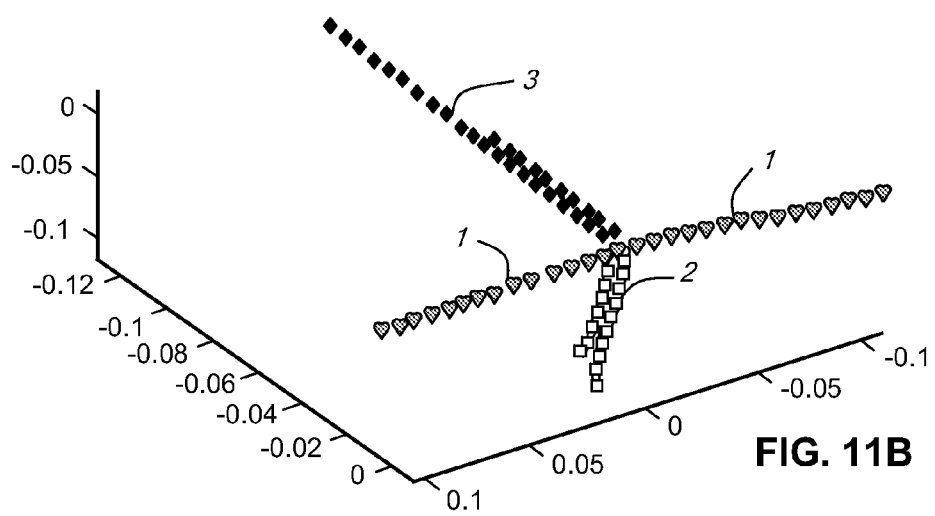
Figure 11C:
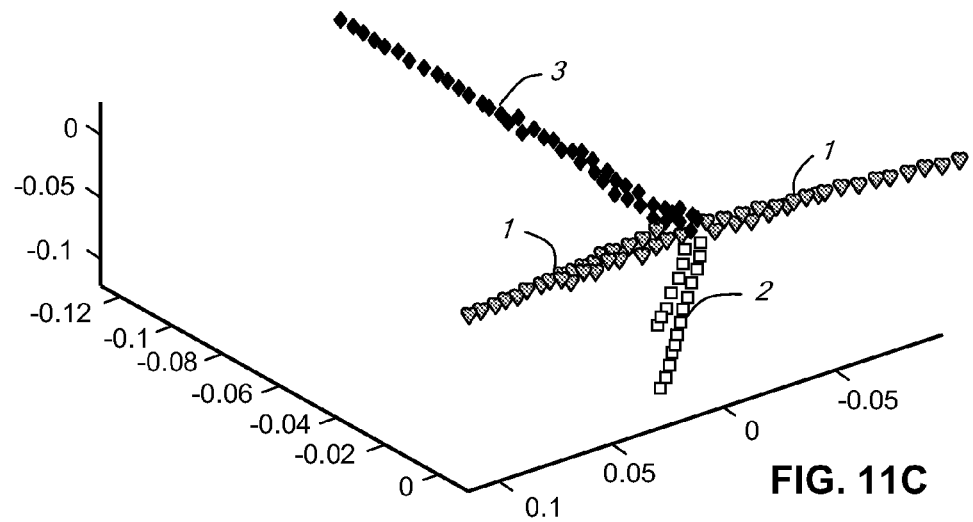

In another perceptual clustering example, samples of handwritten digits 1, 2, and 3 in the test set of the MNIST handwritten digit database may be used. There are 1135, 1032, and 1010 samples, respectively. The representations of samples may be directly visualized in the associated feature spaces instead of a quantified comparison as different clustering methods should be chosen for different distributions of mapped points. It may be more intuitive to compare the distinctive characteristics of the involved algorithms by visual perception. FIGS. 11A-C illustrate the embeddings of the handwritten digits clustering. Grey hearts represent the digit "1", white squares "2" and black diamonds "3". FIG. 11A illustrates clustering using the NJW clustering technique. The three data classes (digits 1, 2 and 3) are not clearly separated. FIG. 11B illustrates perceptual clustering using a coding length contextual set descriptor in accordance with implementations of various techniques described herein. FIG. 11C illustrates perceptual clustering using a centroid contextual set descriptor in accordance with implementations of various techniques described herein. As shown in FIG. 11A-C, the perceptual clustering algorithms yield more compact and clearer representations of clusters than conventional methods.

Figure 12A:
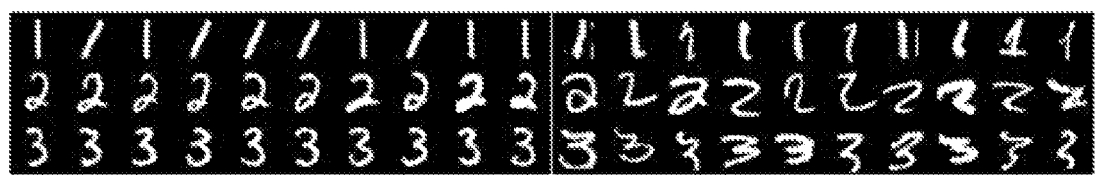
Figure 12B:
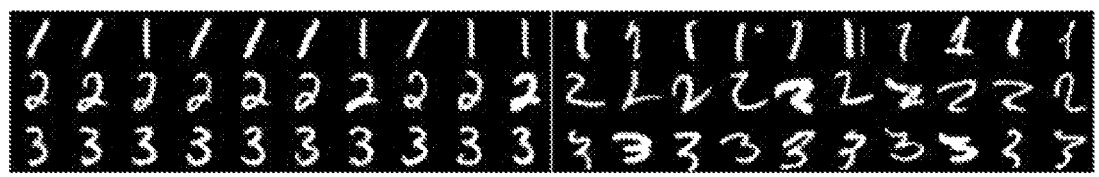

In perceptual clustering, different clusters may be mapped approximately into different linear subspaces. The clusters may be easily identified by various methods. For each identified cluster in the perceptual feature space, the portion of the data structure mapped farthest from the origin may contain the least noise and the portion of the data structure mapped nearest from the origin contain more noise. FIGS. 12A and 12B illustrate the data spaces corresponding to the feature spaces in the embeddings in FIGS. 11B and 11C, respectively. The first ten columns of digits correspond to the data points farthest from the origin in FIGS. 11B-C. The last ten columns of digits correspond to the data points closest to the origin in FIGS. 11B-C. As expected, the digits containing more noise are in the last ten columns of digits. However, the perceptual clustering algorithm was able to correctly cluster the digits regardless of the noise.

Figure 13E:
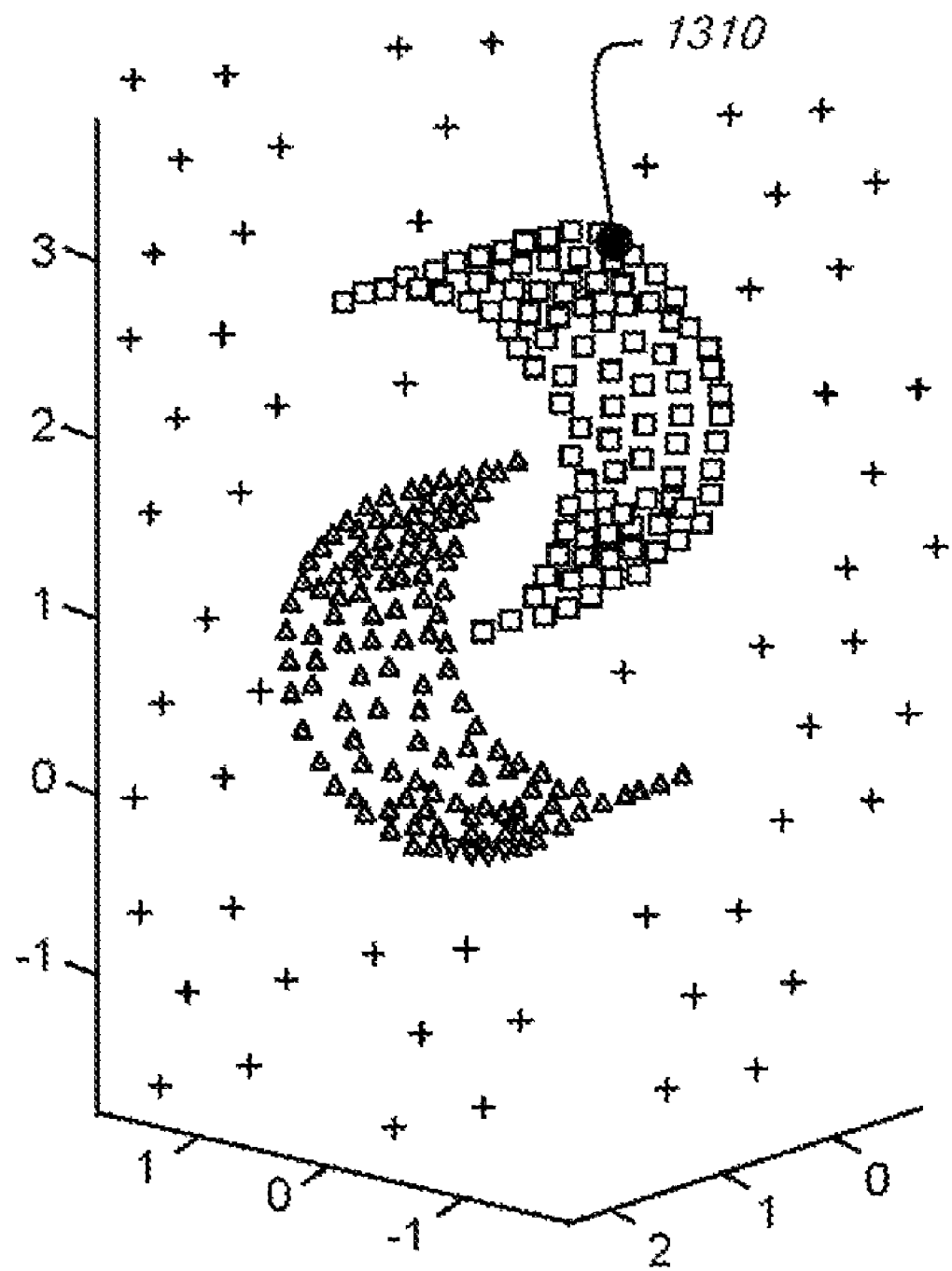

In another implementation, a perceptual ranking algorithm may consist of modeling the digraph of the data and forming $\Theta$ in Equation 14. Then, given a vector v whose i-th elements is 1 if it corresponds to a labeled point and zeros elsewhere, the score vectors $s=(I-\alpha\Theta)^{-1}v$, where $\alpha$ is a free parameter in [0,1], may be computed. The scores, s, may be sorted in descending order. The sample data points with large scores may be considered to be in the same class as the labeled point. FIGS. 13A-E illustrate the results of perceptual ranking on the two half-cylinders data in accordance with implementations of various techniques described herein. One data point may be randomly selected and labeled on one of the half-cylinders for each trial. The selected data point in each FIG. 13A-E may be depicted by the larger circular dot 1310. Once the data point 1310 is selected, the remaining data points may be ranked according to similarity to the selected data point 1310. Then the largest ranking scores may be identified as a single data class. In FIGS. 13A-E, the data class may be depicted with white squares and be the upper half-cylinder, the half-cylinder containing the selected data point. In this example, K=10 and $\alpha$=0.999. FIGS. 13A-D illustrate the results of perceptual ranking using the coding length contextual set descriptor on the two half-cylinders data with increasing noise data points, 400, 800, 1200 and 1600 noise data points respectively. FIG. 13E illustrates the results of perceptual ranking using the centroid contextual set descriptor on the two half-cylinders data. The perceptual ranking algorithm accurately labels the data points on the labeled surface. The results may be robust against noise.

Figure 14A:
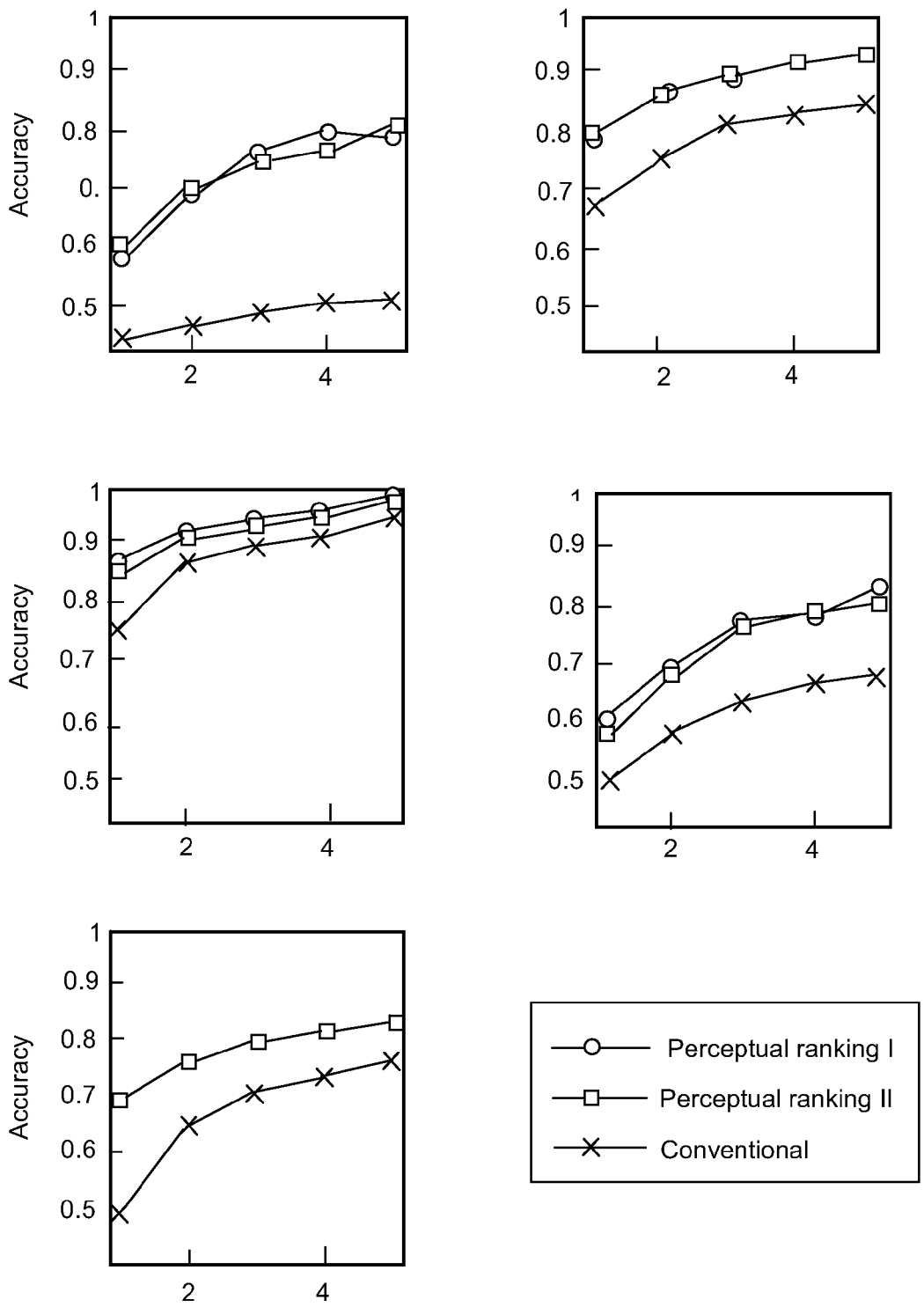

In another perceptual ranking example, a database of real photos of a family and its friends may be used. The faces in photos may be automatically detected, cropped and aligned according to the positions of eyes. For example, 980 faces of 26 persons may be used. The algorithm of local binary pattern may be applied to extract the expressive features and then exploit dual-space LDA to extract the discriminating features from the LBP features. Then conventional ranking and perceptual ranking, in accordance with implementations of various techniques described herein, may be performed. The ratio of the number of correctly ranked faces to the total number of faces in the first 50 ranked faces may be considered as the accuracy measure. Specifically, let Z denote the ranked faces and z the correctly ranked ones. Then, the accuracy may be defined as z/Z. For each face, the ranking experiment may be performed for two hundred trials. FIGS. 14A-C illustrate the accuracy and stability of perceptual ranking in accordance with implementations of various techniques described herein. FIG. 14A illustrates the mean accuracy results for five perceptually ranked faces. Each graph depicts the results for a single face where the line with circles represents the results of perceptual ranking using the coding length contextual set descriptor, the line with squares represents the results of perceptual ranking using the centroid contextual set descriptor and the line with x's represents conventional ranking. Perceptual ranking may consistently have higher accuracy. FIGS. 14B and 14C illustrate that perceptual ranking may be stable with the variations of $\alpha$ and K, respectively.

Although the above examples describe the analyzed data as being image data, it should be understood that any type of data maybe analyzed using the method 200 for modeling data affinities and data structures using local contexts in accordance with implementations of various techniques described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for modeling data structures, comprising:
   (a) calculating a contextual distance between a selected data point in a data sample and a data point in a contextual set of the selected data point, wherein the contextual set comprises the selected data point and one or more data points in the neighborhood of the selected data point and wherein the contextual distance is the difference between the selected data point's contribution to the integrity of the geometric structure of the contextual set and the data point's contribution to the integrity of the geometric structure of the contextual set;
   (b) repeating step (a) for each data point in the contextual set of the selected data point;
   (c) repeating steps (a)-(b) for each selected data point in the data sample; and
   (d) creating a digraph using a plurality of contextual distances generated in steps (a)-(c);
   wherein the method is performed by a computer.

2. The method of claim 1, further comprising: determining a contextual set for each data point in a data sample.

3. The method of claim 1, further comprising: selecting a contextual set descriptor to apply to the contextual sets.

4. The method of claim 3, wherein calculating the contextual distance between a selected data point in a data sample and a data point in a contextual set of the selected data point further comprises: using the contextual set descriptor in the calculation of the contextual distance.

5. The method of claim 1, further comprising: calculating one or more local digraph Laplacians using the digraph.

6. The method of claim 5, further comprising: deriving a global digraph Laplacian by aligning the local digraph Laplacians.

7. The method of claim 6, further comprising: ranking the data points in the data sample using the global digraph Laplacian.

8. The method of claim 6, further comprising: creating a digraph embedding of the global digraph Laplacian by computing one or more eigenvectors of the global digraph Laplacian.

9. The method of claim 8, further comprising: removing one or more noise data points from the digraph embedding to isolate the data structures.

10. The method of claim 8, further comprising: performing clustering on one or more feature points in the digraph embedding.

11. A computer storage medium having stored thereon computer-executable instructions which, when executed by a computer, cause the computer to:
    (a) calculate a contextual distance between a selected data point in a data sample and a data point in a contextual set of the selected data point, wherein the contextual set comprises the selected data point and one or more data points in the neighborhood of the selected data point and wherein the contextual distance is the difference between the selected data point's contribution to the integrity of the geometric structure of the contextual set and the data point's contribution to the integrity of the geometric structure of the contextual set;
    (b) repeat step (a) for each data point in the contextual set of the selected data point;
    (c) repeat steps (a)-(b) for each selected data point in the data sample;
    (d) create a digraph using a plurality of contextual distances generated in steps (a)-(c); and
    (e) derive a global digraph Laplacian using the digraph.

12. The computer storage medium of claim 11, wherein the computer-executable instructions which, when executed by a computer, cause the computer to calculate a contextual distance between a selected data point in a data sample and a data point in a contextual set of the selected data point is further configured to cause the computer to:
    determine a contextual set for each data point in a data sample;
    select a contextual set descriptor to apply to the contextual sets; and
    use the contextual set descriptor in the calculation of the contextual distance.

13. The computer storage medium of claim 11, wherein the computer-executable instructions which, when executed by a computer, cause the computer to derive a global digraph Laplacian, is further configured to cause the computer to:
    calculate one or more local digraph Laplacians using the digraph; and
    align the local digraph Laplacians to derive the global digraph Laplacian.

14. The computer storage medium of claim 11 is further configured to cause the computer to: rank the data points in the data sample using the global digraph Laplacian.

15. The computer storage medium of claim 11 is further configured to cause the computer to: create a digraph embedding of the global digraph Laplacian.

16. The computer storage medium of claim 15, wherein the computer-executable instructions which, when executed by a computer, cause the computer to create the digraph embedding of the global digraph Laplacian, is further configured to cause the computer to: compute one or more eigenvectors of the global digraph Laplacian to create a digraph embedding.

17. The computer storage medium of claim 15 is further configured to cause the computer to: perform clustering on one or more feature points in the digraph embedding.

18. A computer system, comprising:
    a processor; and
    a memory comprising program instructions executable by the processor to:
    (a) calculate a contextual distance between a selected data point in a data sample and a data point in a contextual set of the selected data point;
    (b) repeat step (a) for each data point in the contextual set of the selected data point;
    (c) repeat steps (a)-(b) for each selected data point in the data sample;
    (d) create a digraph using a plurality of contextual distances generated in steps (a)-(c);

(e) calculate one or more local digraph Laplacians using the digraph; and (f) derive a global digraph Laplacian by aligning the local digraph Laplacians.

19. The computer system of claim 18, wherein the program instructions executable by the processor further comprises program instructions executable by the processor to:

determine a contextual set for each data point in a data sample;

select a contextual set descriptor to apply to the contextual sets; and use the contextual set descriptor in the calculation of the contextual distances.

20. The computer system of claim 18, wherein the program instructions executable by the processor further comprises program instructions executable by the processor to: rank the data points in the data sample using the global digraph Laplacian.

* * * * *